(12) United States Patent
Singhee et al.

(10) Patent No.: US 8,155,938 B2
(45) Date of Patent: Apr. 10, 2012

(54) METHOD AND APPARATUS FOR SAMPLING AND PREDICTING RARE EVENTS IN COMPLEX ELECTRONIC DEVICES, CIRCUITS AND SYSTEMS

(75) Inventors: Amith Singhee, Pittsburgh, PA (US); Rob Rutenbar, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 895 days.

(21) Appl. No.: 12/057,537

(22) Filed: Mar. 28, 2008

(65) Prior Publication Data
US 2009/0248387 A1 Oct. 1, 2009

(51) Int. Cl.
G06G 7/48 (2006.01)
(52) U.S. Cl. .......................................................... 703/6
(58) Field of Classification Search ........................ 703/6
See application file for complete search history.

(56) References Cited

U.S. PATENT DOCUMENTS

| | | | |
|---|---|---|---|
| 4,541,114 A | | 9/1985 | Rutenbar et al. |
| 5,343,554 A | * | 8/1994 | Koza et al. ....................... 706/13 |
| 5,825,660 A | | 10/1998 | Cagan et al. |
| 5,940,810 A | | 8/1999 | Traub et al. |
| 6,058,377 A | | 5/2000 | Traub et al. |
| 6,711,725 B1 | | 3/2004 | Rutenbar et al. |
| 6,874,133 B2 | | 3/2005 | Gopalakrishnan et al. |
| 6,918,102 B2 | | 7/2005 | Rutenbar et al. |
| 6,957,400 B2 | | 10/2005 | Liu et al. |
| 7,058,916 B2 | | 6/2006 | Phelps et al. |
| 7,093,220 B2 | | 8/2006 | Fallon et al. |

| | | | |
|---|---|---|---|
| 2003/0009729 A1 | | 1/2003 | Phelps et al. |
| 2006/0206294 A1 | | 9/2006 | Rutenbar |
| 2006/0206839 A1 | | 9/2006 | Phelps et al. |
| 2007/0220455 A1 | | 9/2007 | Joshi et al. |
| 2009/0154605 A1 | * | 6/2009 | Tan et al. ....................... 375/341 |

OTHER PUBLICATIONS

Kanj et al., Proc. DAC, 2006, "Mixture Importance Sampling and Its Application to the Analysis of SRAM Designs in the Presence of Rare Failure Events", p. 69-72.*
A. J. McNeil, "Estimating the Tails of Loss Severity Distributions using Extreme Value Theory", ASTIN Bulletin, 27(1), pp. 117-137, 1997.*
Bruno et al. Studies in Classificaiaton, Data Analysis, and Knowledge Organization, 2005, "Selecting the Training Set in Classification Problems with Rare Events", p. 39-46.*
Singhee et al. 2008, "Recursive Statistical Blockagde: An Enhanced Technique for Rare Event Simulation with Application to SRAM Circuit design", 6 pages.*

* cited by examiner

*Primary Examiner* — Paul Rodriguez
*Assistant Examiner* — Eunhee Kim
(74) *Attorney, Agent, or Firm* — David Garrod

(57) ABSTRACT

The invention provides methods for enhancing circuit reliability under statistical process variation. For highly replicated circuits such as SRAMs and flip flops, a rare statistical event for one circuit may induce a not-so-rare system failure. To combat this, the invention discloses the method called "Statistical Blockade," a Monte Carlo-type technique that allows the efficient filtering—blocking—of unwanted samples insufficiently rare in the tail distributions of interest, with speedups of 10-100×. Additionally, the core Statistical Blockade technique is further extended in a "recursive" or "bootstrap" formulation to create even greater efficiencies under a much wider variety of circuit performance metrics, in particular two-sided metrics such a Data Retention Voltage (DRV) which prior Monte Carlo techniques could not handle.

15 Claims, 16 Drawing Sheets

Classification-Based Sampling

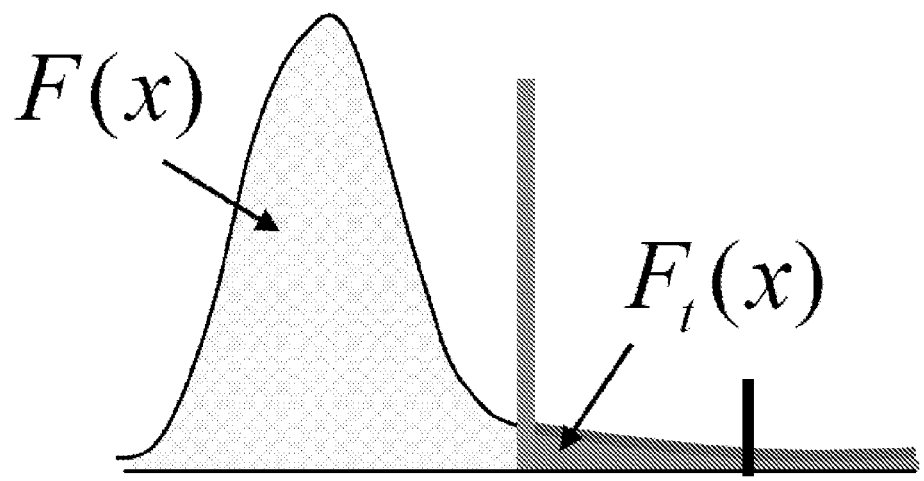
Figure 1: Example distribution of a circuit performance metric (e.g., SRAM write time). The solid region is the *tail* region.

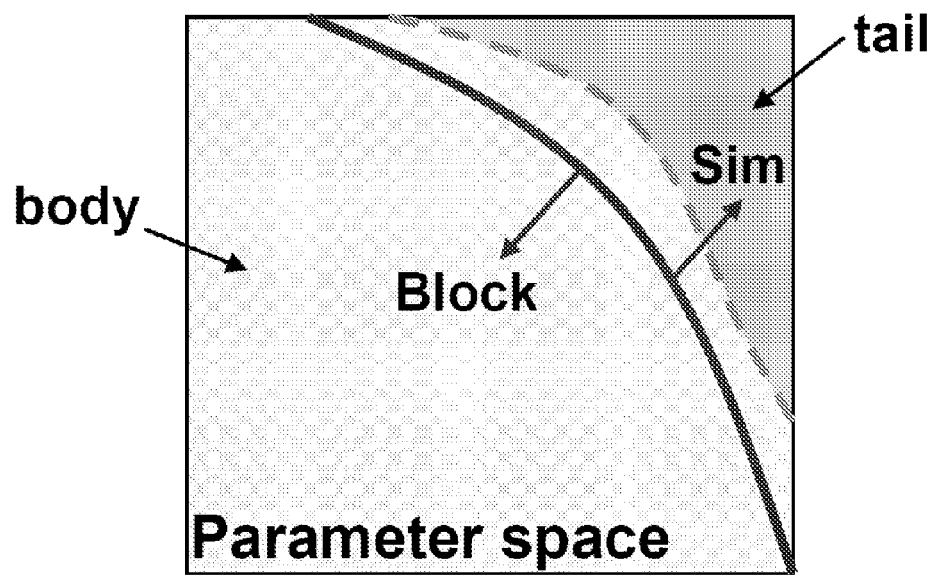
Figure 2: The classifier in statistical parameter space is shown as a solid boundary. The dashed line is the exact tail-region boundary. The relaxed classification boundary allows the blocking of most tail points.

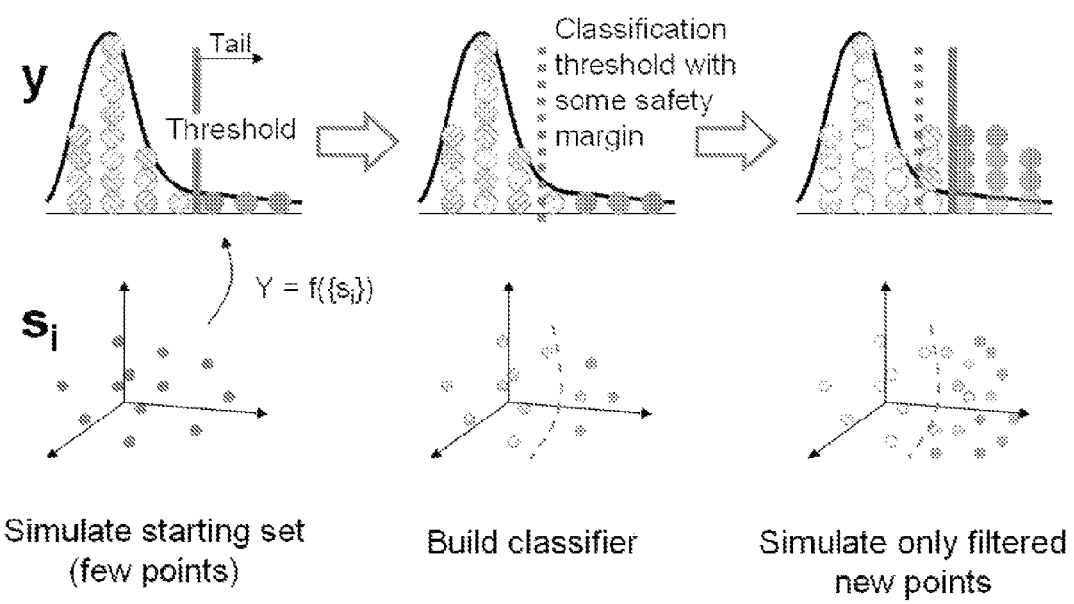
Figure 3: Classification-Based Sampling

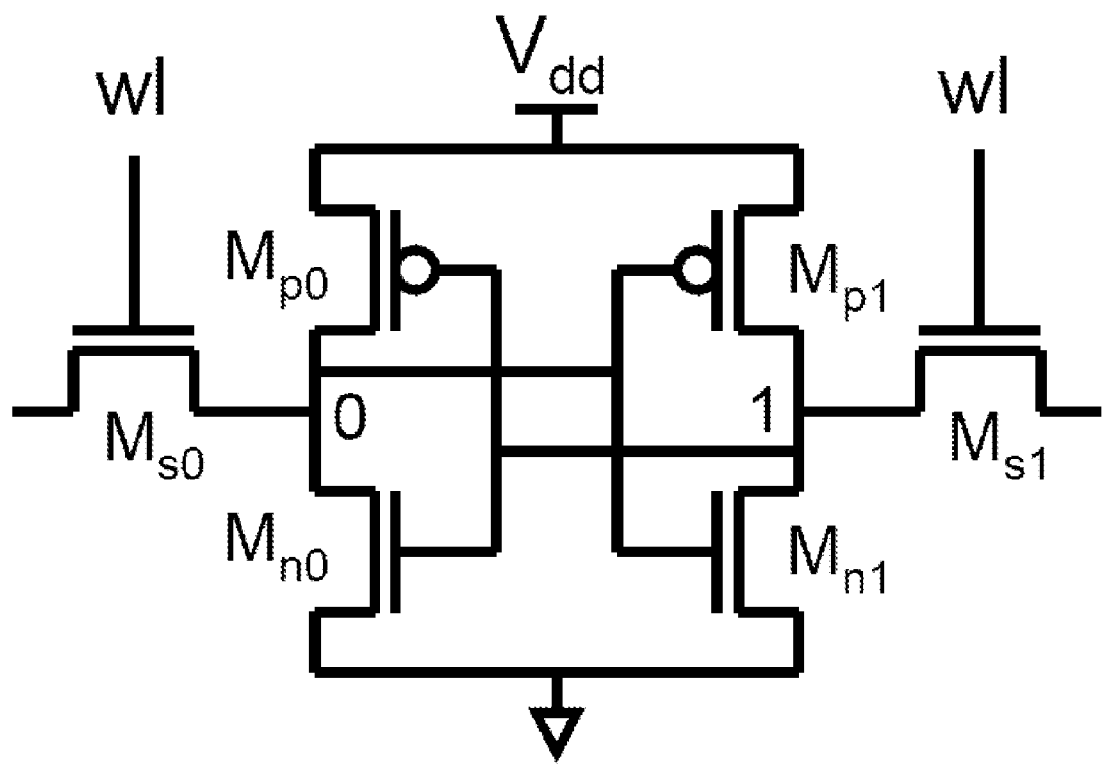
Figure 4: Standard 6-T SRAM Cell

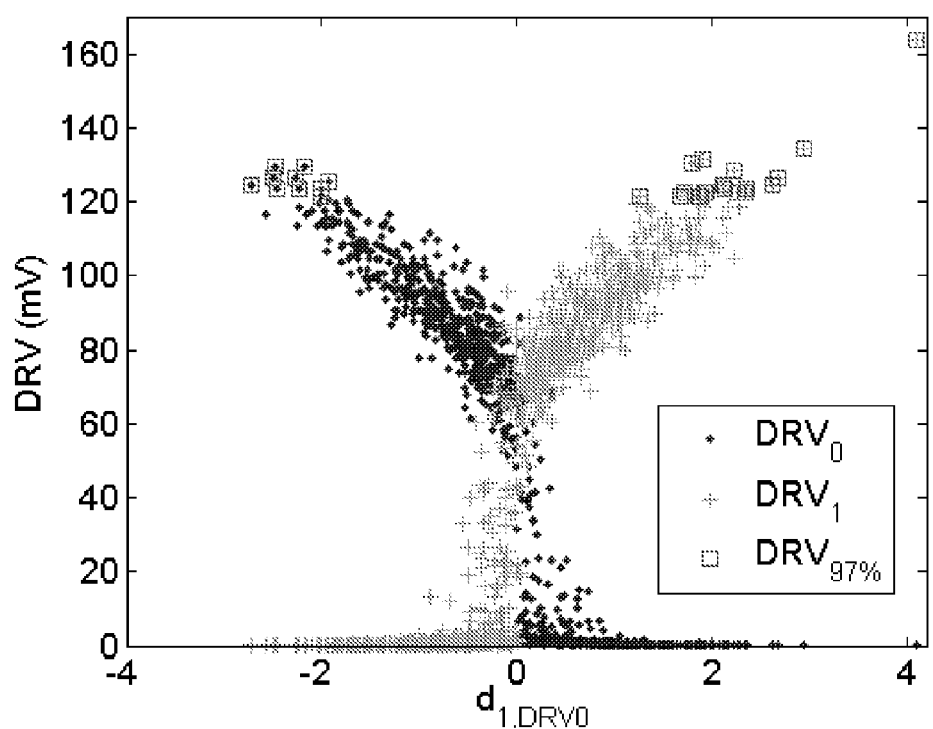
Figure 5: Behavior of DRV0 and DRV1 along the direction of maximum variation in DRV0. The worst 3% DRV values are shown as squares, clearly showing the disjoint tail regions (along this direction in the parameter space).

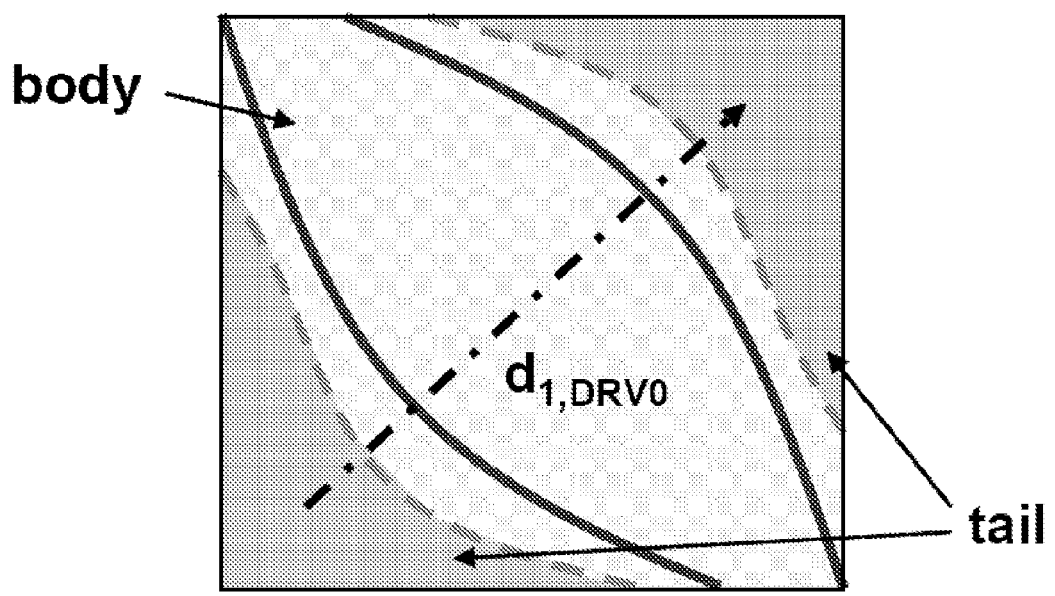
Figure 6: Parameter space with two disjoint tail regions for the same circuit metric.

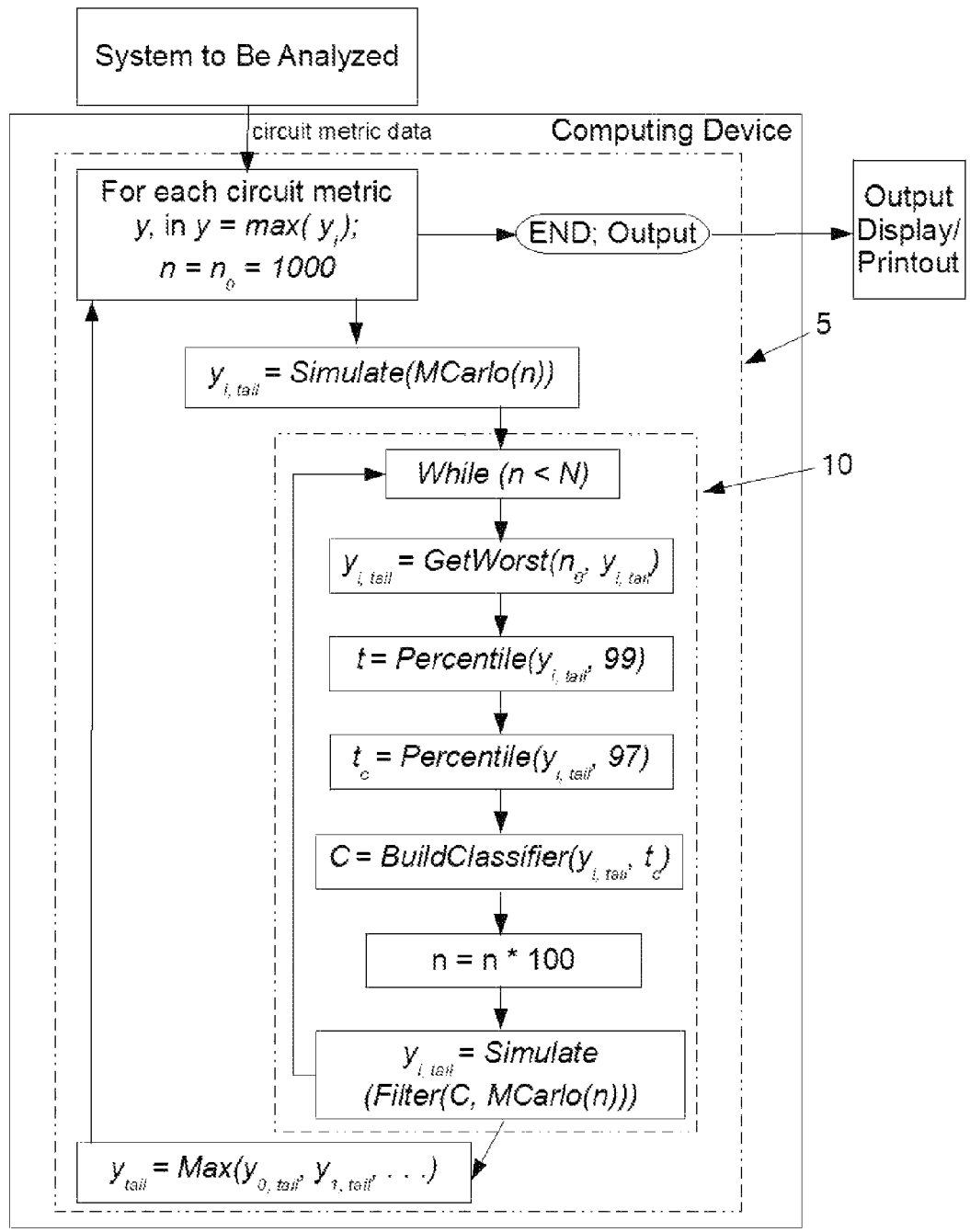
Figure 7: Recursive formulation for Statistical Blockade for simulating extremely rare events, that can also handle conditionals.

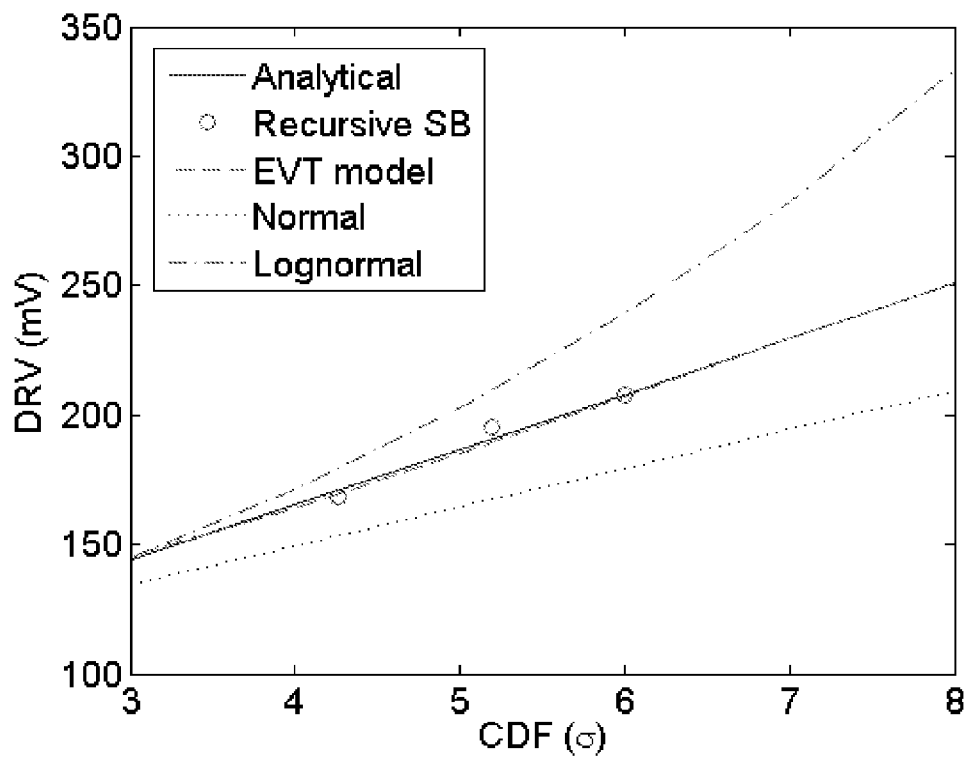
Figure 8: The worst-case DRV values from RSB closely match the model in Figure 5. Fitting an EVT model as per Background Reference [1] to the data from RSB also shows close match with Figure 5. Normal and log-normal fits are inaccurate.

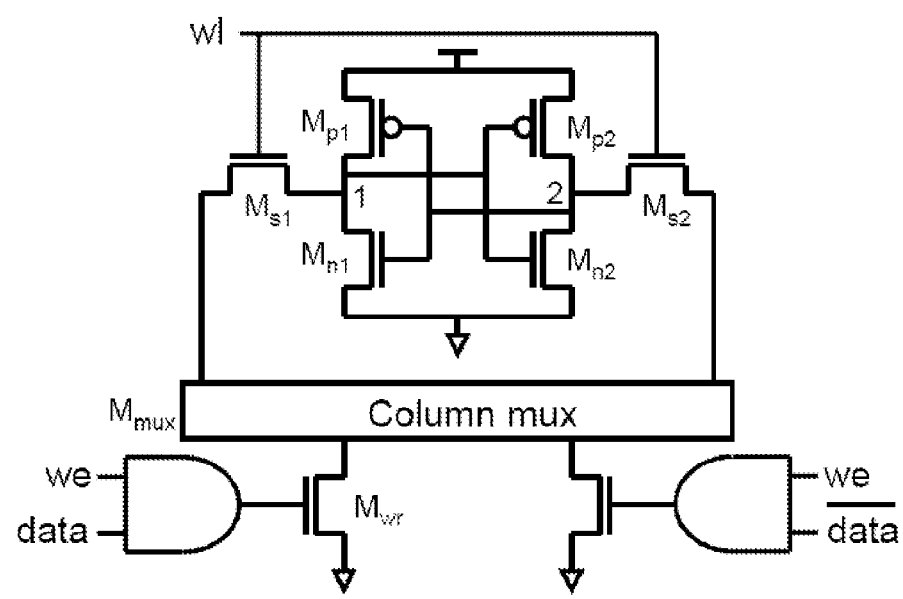
Figure 9: 6-T SRAM cell with column mux and write drivers. $V_t$ variation on named devices and global $t_{ox}$ variation.

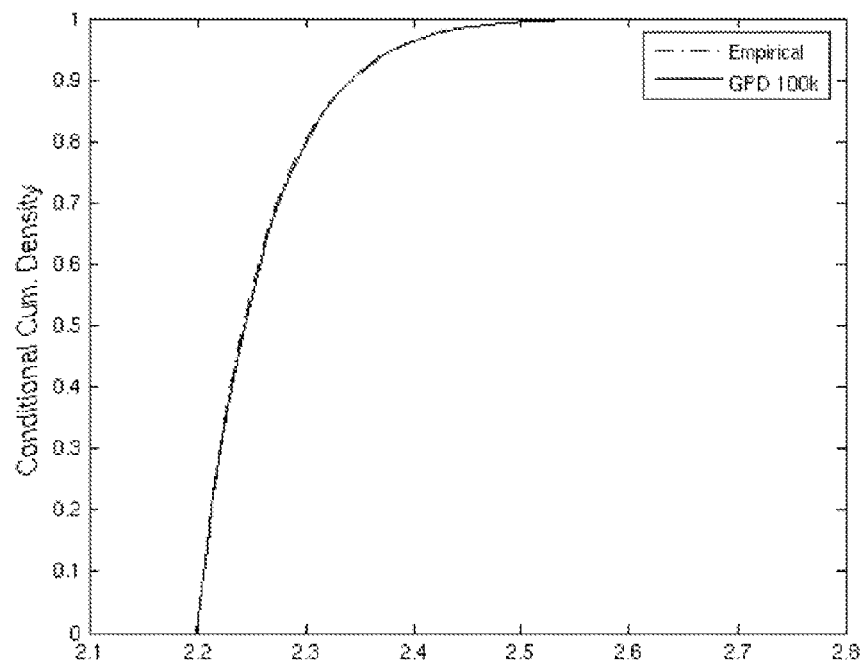
Figure 10: Comparison of tail Model CDF (5379 simulations) with empirical tailCDF (1 million simulations). They substantially map each other.

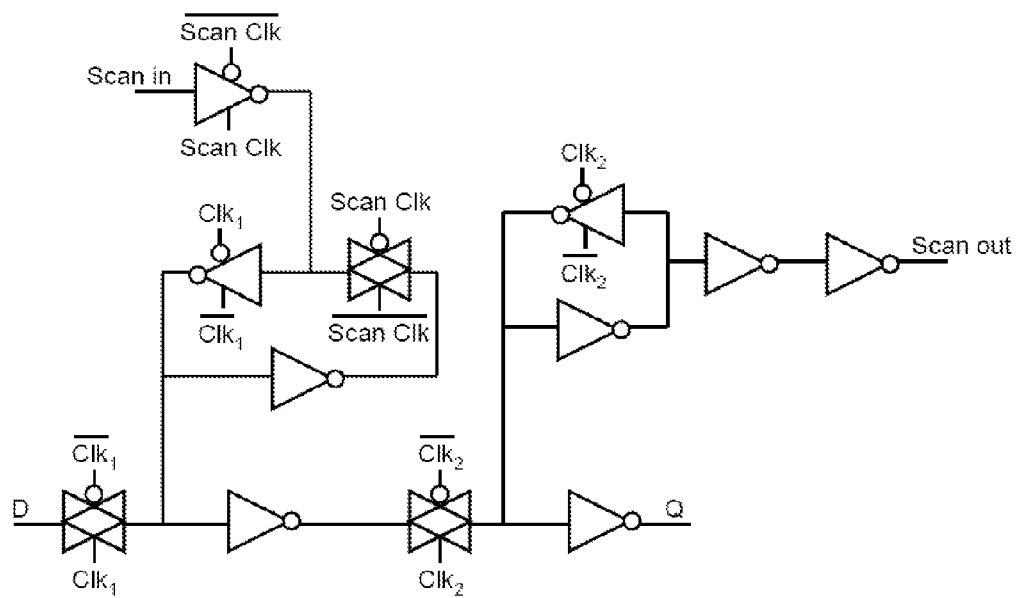
Figure 11: Master-Slave Flip-Flop with Scan Chain Component

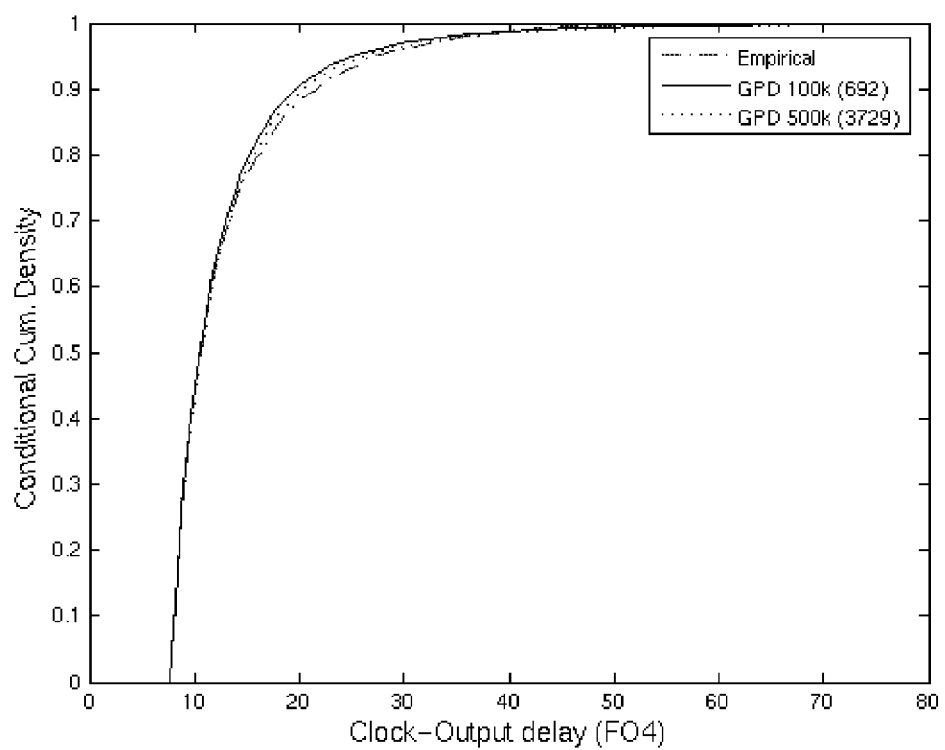
Figure 12: Tail model for MSFF (1692 and 4729 simulations) compared with empirical model (500,000 simulations).

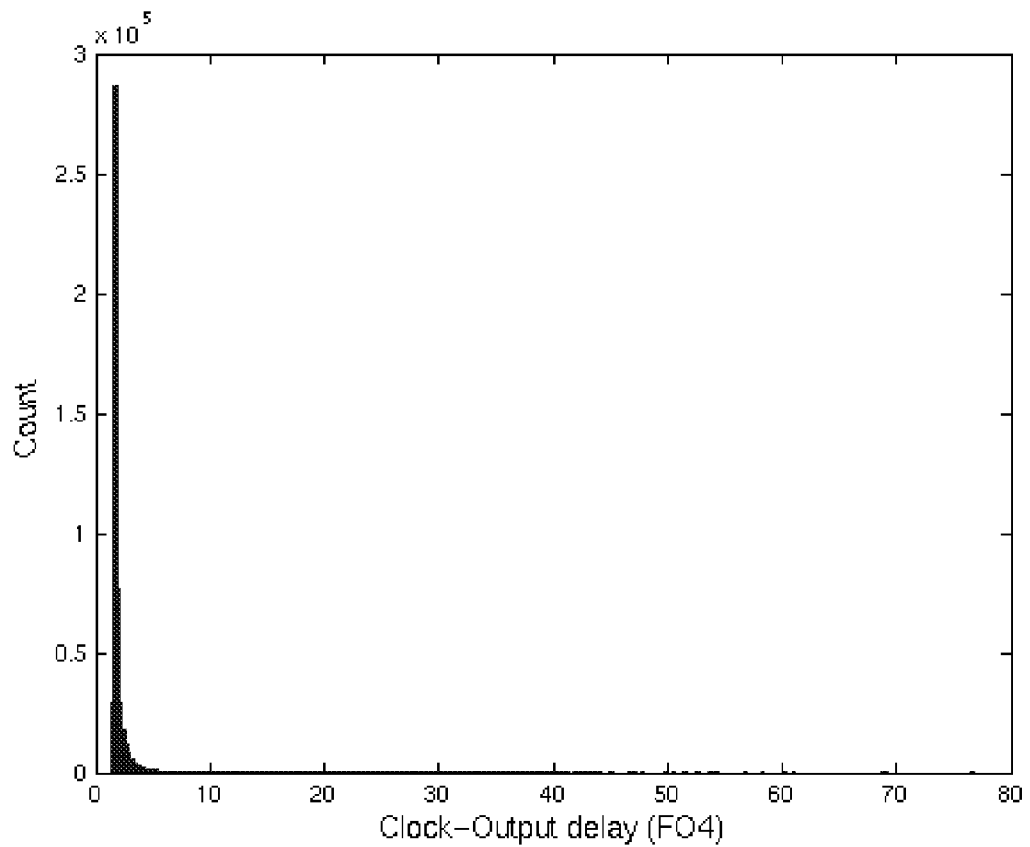
Figure 13: Probability density plot for Clock-Output delay of the MSFF, showing a long, heavy tail.

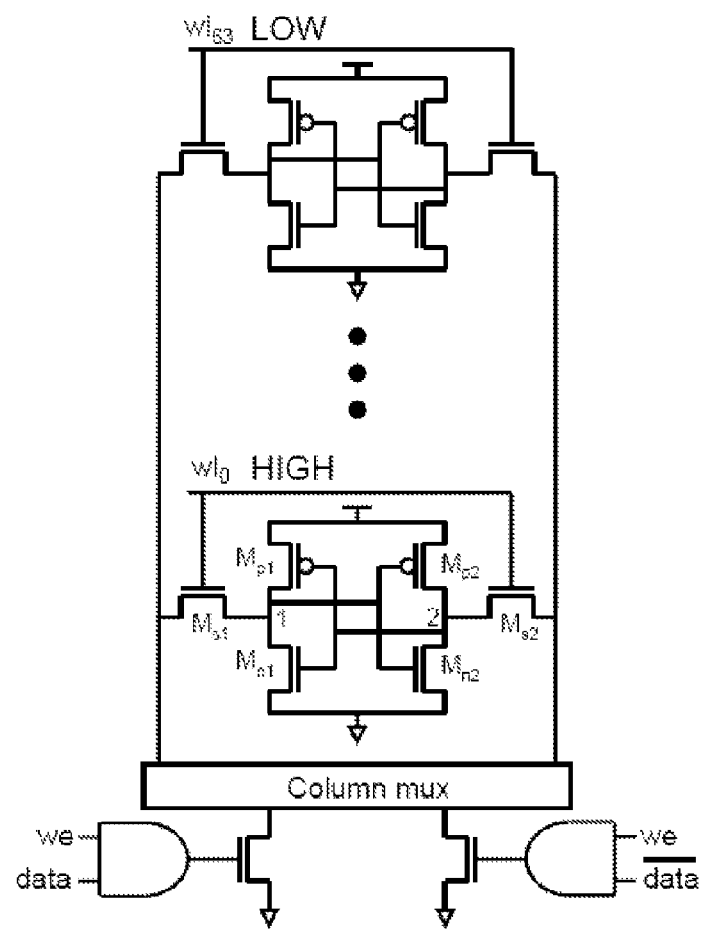
Figure 14: 64-bit SRAM column with mux and write drivers. $V_t$ variation on all devices and global $t_{ox}$ variation.

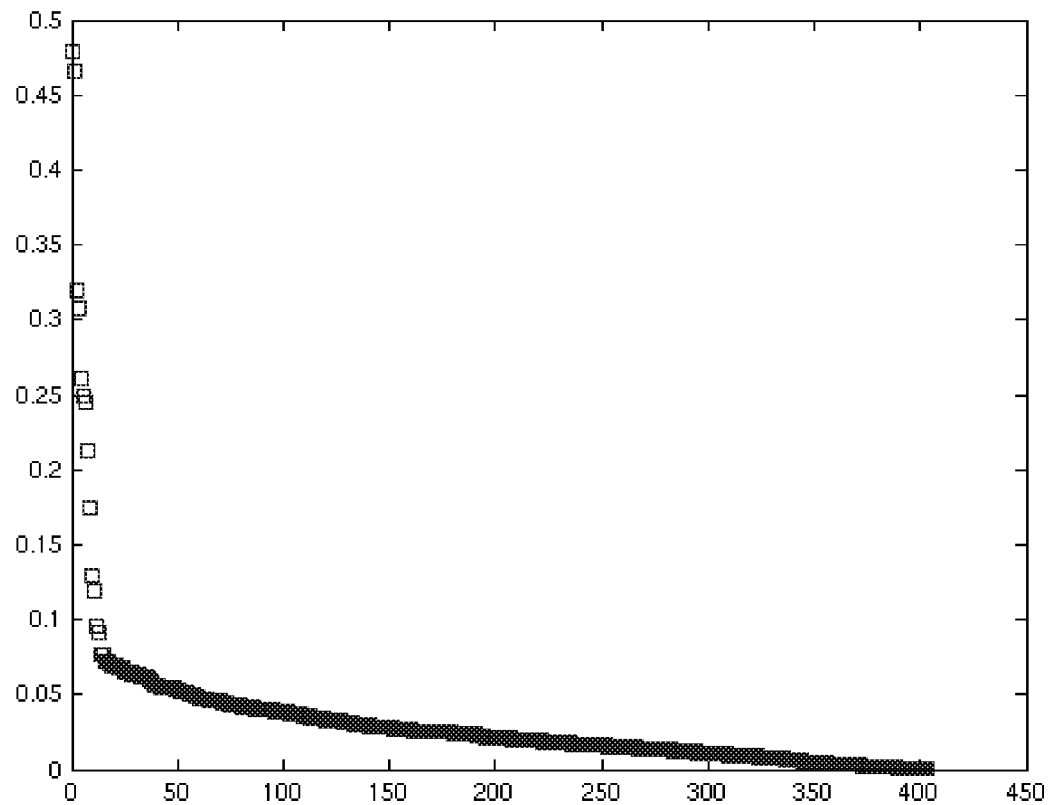
Figure 15: Absolute values of rank correlation between the statistical parameters and write time of the SRAM column.

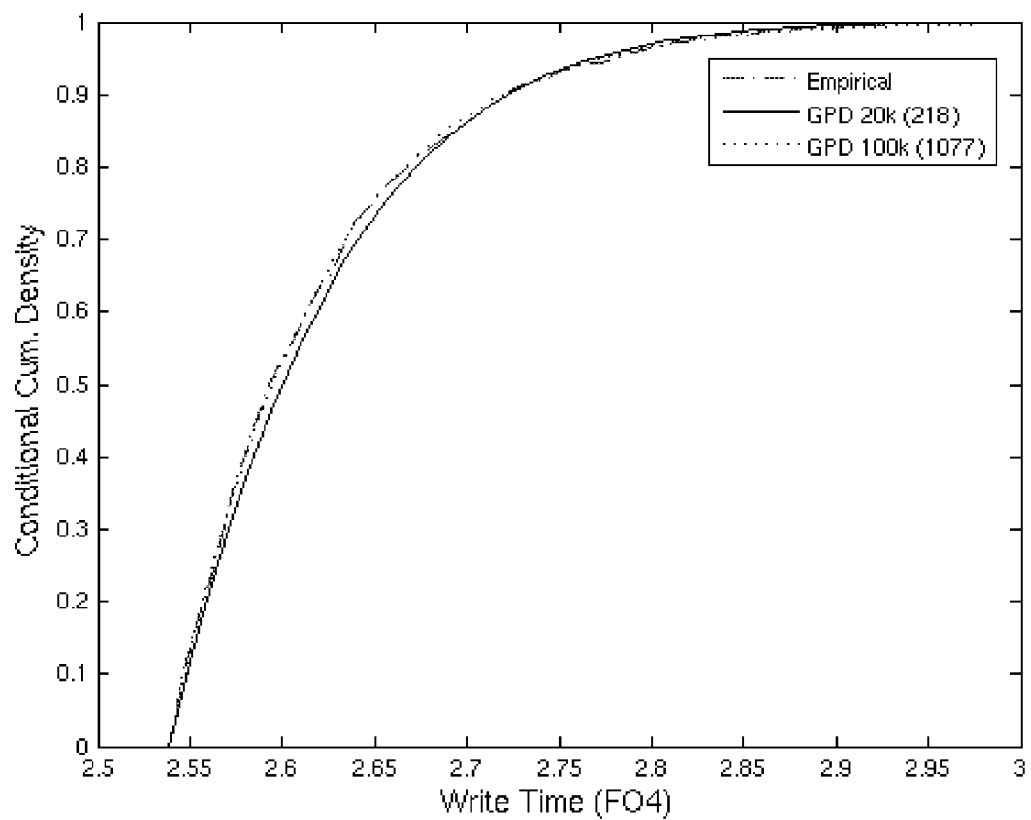
Figure 16: Tail model for SRAM column (2046 and 6314 simulations) compared with empirical model (100,000 simulations).

METHOD AND APPARATUS FOR SAMPLING AND PREDICTING RARE EVENTS IN COMPLEX ELECTRONIC DEVICES, CIRCUITS AND SYSTEMS

BACKGROUND

Background Discussion

NOTE: Some of the references listed in the next subsection are referred to in this discussion using the reference number in square brackets, [ ].

Circuit reliability under statistical process variation is an area of growing concern. As transistor sizes are becoming smaller, small imperfections during manufacturing result in large percentage variation in the circuit performance. Hence, statistical analysis of circuits, given probability distributions of the circuit parameters, has become indispensable. Performing such analysis usually entails estimating some metric, like parametric yield, failure probability, etc. Designs that add excess safety margin, or rely on simplistic assumptions about "worst case" corners no longer suffice. Worse, for critical circuits such as SRAMs and flip flops, replicated across 10 K-10 M instances on a large design, there is the new problem that statistically rare events are magnified by the sheer number of these elements. In such scenarios, an exceedingly rare event for one circuit may induce a not-so-rare failure for the entire system. Existing techniques perform poorly when tasked to generate both efficient sampling and sound statistics for these rare events: Such techniques are literally seeking event in the 1-in-a-million regime, and beyond. Statistical metrics such as parametric yield and failure probability can be represented as high dimensional integrals and are often evaluated using a Monte Carlo simulation.

Monte Carlo analysis [2] remains the gold standard for the required statistical modeling. Standard Monte Carlo techniques are, by construction, most efficient at sampling the statistically likely cases. However, when used for simulating statistically unlikely or rare events, these techniques are extremely slow. For example, to simulate a 5 event, 100 million circuit simulations would be required, on average.

One avenue of attack is to abandon Monte Carlo. Several analytical and semi-analytical approaches have been suggested to model the behavior of SRAM cells (see Background references [3], [4], and [5]) and digital circuits (see Background reference [6]) in the presence of process variations. However, all such approaches suffer from approximations necessary to make the problem tractable. Background references [4] and [6] assume a linear relationship between the statistical variables and the performance metrics (e.g. static noise margin), and assume that the statistical process parameters and resulting performance metrics are normally distributed. This can result in gross errors, especially while modeling rare events, as discussed in the specification. When the distribution varies significantly from Gaussian, Background reference [4] chooses an F-distribution in an ad hoc manner. Background reference [3] presents a complex analytical model limited to a specific transistor model (the transregional model) and further limited to only static noise margin analysis for the 6 T SRAM cell. Background reference [5] again models only the static noise margin (SNM) for SRAM cells under assumptions of independence and identical distribution of the upper and lower SNM, which may not always be valid.

A different avenue of attack is to modify the Monte Carlo strategy. Background reference [7] shows how Importance Sampling can be used to predict failure probabilities. Recently, as discussed in Background reference [8], an efficient formulation of these ideas was applied for modeling rare failure events for single 6 T SRAM cells, based on the concept of Mixture Importance Sampling from Background reference [9]. The approach uses real SPICE simulations with no approximating equations. However, the method only estimates the exceedence probability of a single value of the performance metric. A re-run is needed to obtain probability estimates for another value. No complete model of the tail of the distribution is computed. The method also combines all performance metrics to compute a failure probability, given fixed thresholds. Hence, there is no way to obtain separate probability estimates for each metric, other than a separate run per metric. Furthermore, given that Background reference [7] advises against importance sampling in high dimensions, it is unclear if this approach will scale efficiently to large circuits with many statistical parameters.

Consequently, there exists a need to develop Monte Carlo-type strategies that sample and interpret systems data much more rapidly and efficiently while maintaining meaningful results.

LIST OF RELATED ART

The following is a listed of related art that is referred to in and/or forms some of the basis of other sections of this specification.

[1] A. Singhee, R. A. Rutenbar, "Statistical Blockade: A Novel Method for Very Fast Monte Carlo Simulation of Rare Circuit Events, and its Application", *Proc. DATE*, 2007.

[2] G. S. Fishman, "A First Course in Monte Carlo", Duxbury Press, October 2005.

[3] A. J. Bhavnagarwala, X. Tang, J. D. Meindl, "The Impact of Intrinsic Device Fluctuations on CMOS SRAM Cell Stability", *J. Solid State Circuits*, 26(4), pp 658-665, April 2001.

[4] S. Mukhopadhyay, H. Mahmoodi, K. Roy, "Statistical Design and Optimization of SRAM Cell for Yield Enhancement", *Proc. ICCAD*, 2004.

[5] B. H. Calhoun, A. Chandrakasan, "Analyzing Static Noise Margin for Sub-threshold SRAM in 65 nm CMOS", *Proc. ESSCIRC*, 2005.

[6] H. Mahmoodi, S. Mukhopadhyay, K. Roy, "Estimation of Delay Variations due to Random-Dopant Fluctuations in Nanoscale CMOS Circuits", *J. Solid State Circuits*, 40(3), pp 1787-1796, September 2005.

[7] D. E. Hocevar, M. R. Lightner, T. N. Trick, "A Study of Variance Reduction Techniques for Estimating Circuit Yields", *IEEE Trans. CAD*, 2(3), July, 1983.

[8] R. Kanj, R. Joshi, S. Nassif, "Mixture Importance Sampling and its Application to the Analysis of SRAM Designs in the Presence of Rare Failure Events", *Proc. DAC*, 2006.

[9] T. C. Hesterberg, "Advances in Importance Sampling", PhD Dissertation, Dept. of Statistics, Stanford University, 1988, 2003.

[10] T. Hastie, R. Tibshirani, J. Friedman, "The Elements of Statistical Learning", Springer Verlag, 2003.

[11] A. J. McNeil, "Estimating the Tails of Loss Severity Distributions using Extreme Value Theory", *ASTIN Bulletin*, 27(1), pp 117-137, 1997.

[12] R. K. Krishnamurthy et al., "High-performance and low-power challenges for sub-70 nm microprocessor circuits," *Proc. CICC*, 2002.

[13] A. Singhee, R. A. Rutenbar, "Beyond Low-Order Statistical Response Surfaces: Latent Variable Regression for Efficient, Highly Nonlinear Fitting", *Proc. DAC*, 2007.

[14] T. Joachims, Making large-Scale SVM Learning Practical. Advances in Kernel Methods—Support Vector Learning, B. Schölkopf and C. Burges and A. Smola (ed.), MIT-Press, 1999.

[15] J. Wang, A. Singhee, R. A. Rutenbar, B. H. Calhoun, "Statistical Modeling for the Minimum Standby Supply Voltage of a Full SRAM Array", *Proc. ESSCIRC*, 2007.

[16] A. Balkema, L. de Haan, "Residual life time at great age", *Annals of Probability*, 2(5), pp 792-804, 1974.

[17] Pickands III, "Statistical Inference Using Extreme Order Statistics", *The Annals of Statistics*, 3(1), pp 119-131, January 1975.

[18] R. Fisher, L. Tippett, "Limiting Forms of the Frequency Distribution of the Largest or Smallest Member of a Sample", *Proc. Cambridge Phil. Soc.*, 24, pp 180-190, 1928.

[19] B. Gnedenko, "Sur La Distribution Limite Du Terme Maximum D'Une Serie Aleatoire", *The Annals of Mathematics*, 44(3), July 1943.

[20] J. R. M. Hosking, J. R. Wallis, "Parameter and Quantile Estimation for the Generalized Pareto Distribution", *Technometrics*, 29(3), pp 339-349, August 1987.

[21] J. A. Greenwood, J. M. Landwehr, N. C. Matalas, J. R. Wallis, "Probability Weighted Moments: Definition and Relation to Parameters of Several Distributions Expressable in Inverse Form", *Water Resources Research*, 15, pp 1049-1054, 1979.

[22] T. Joachims, "Making Large-Scale SVM Learning Practical", LS8-Report, 24, Universität Dortmund, 1998.

[23] K. Morik, P. Brockhausen, T. Joachims, "Combining Statistical Learning with a Knowledge-based Approach—A Case Study in Intensive Care Monitoring", *Proc. 16th Int'l Conf. on Machine Learning*, 1999.

[24] D. J. Frank, Y. Taur, M. leong, H. P. Wong, "Monte Carlo Modeling of Threshold Variation due to Dopant Fluctuations", *Symp. VLSI Technology*, 1999.

[25] G. E. Noether, "Introduction to Statistics: The Nonparametric Way", Springer, 1990.

[26] http://www.eas.asu.edu/~ptm/

BRIEF SUMMARY OF THE INVENTION

The invention provides a means to efficiently and effectively detect and/or predict relatively rare failures or events to a wide range of industrial circuits and systems. A key approach to the invention is a Statistical Blockade, a general and efficient Monte Carlo method that addresses both problems previously described: Very fast generation of samples—rare events—with sound models of the tail statistics for any performance metric. The method imposes almost no a priori limitations on the form of the statistics for the process parameters, device models, or performance metrics.

The methods disclosed herein extend the core Statistical Blockade technique in a "recursive" or "bootstrap" formulation. Basic Statistical Blockade is capable of predicting events out to 3 to 4 standard deviations ("sigmas" of statistical variation), but not further with any reliability. The extensions disclosed herein show how to recursively apply the technique to much rarer statistical events: 5 to 8 sigma. Additionally, new formulations are disclosed that make it possible to handle a much wider variety of circuit performance metrics, in particular two-sided metrics such a Data Retention Voltage (DRV) which prior techniques could not handle. Together, these innovations make the overall Statistical Blockade methodology dramatically more useful, practical, and applicable to a wider range of industrial circuits and systems.

The key observation behind the Statistical Blockade is that generating each sample is not expensive: Parameters are merely created for a circuit. In one embodiment of the invention, the Statistical Blockade method synthesizes ideas from data mining and Extreme Value Theory, and shows speedups of 10×-100× over standard Monte Carlo.

The data set represented by the parameter samples are used to build classifiers. A classifier is an indicator function that provides a means to determine set membership for complex, high-dimensional, nonlinear data. Instead of building a single classifier for the low-probability tail distribution, two separate classifiers are built to create a parameter space for two disjoint tail regions for the same system/circuit metric. The generated Monte Carlo samples will then be filtered through both these classifiers: Points classified as non-tail by both the classifiers will be blocked, and the rest will be simulated. The basic idea is to use a tail threshold (and its corresponding classification threshold) that is very far out in the tail, so that the simulations are restricted to the very rare events of interest. This is being done in a recursive manner by estimating lower thresholds first and using them to estimate the higher threshold without having to simulate a large number of points.

BRIEF DESCRIPTION OF THE DRAWINGS

FIG. 1 depicts an example distribution of a circuit performance metric.

FIG. 2 depicts a classifier in statistical parameter space.

FIG. 3 depicts classification-based sampling.

FIG. 4 depicts a standard 6-T SRAM cell.

FIG. 5 depicts the behavior of data-retention voltage.

FIG. 6 depicts parameter space with two disjoint tail regions for the same circuit metric.

FIG. 7 depicts a method for recursive formulation for Statistical Blockade for simulating extremely rare events, that can also handle conditionals.

FIG. 8 depicts the worst case data-retention values from Recursive Statistical Blockade.

FIG. 9 depicts a 6-T SRAM cell with column mux and write drivers.

FIG. 10 depicts a comparison of tail Model CDF (5379 simulations) with empirical tailCDF (1 million simulations).

FIG. 11 depicts a master-slave flip-flop with scan chain component.

FIG. 12 depicts a tail model for MSFF (1692 and 4729 simulations) compared with empirical model (500,000 simulations).

FIG. 13 depicts a probability density plot for Clock-Output delay of the MSFF, showing a long, heavy tail.

FIG. 14 depicts a 64-bit SRAM.

FIG. 15 depicts the absolute values of rank correlation between the statistical parameters and write time of the SRAM column.

FIG. 16 depicts the tail model for SRAM column (2046 and 6314 simulations) compared with empirical model (100,000 simulations).

DETAILED DESCRIPTION

NOTE: Some of the references listed in the Background section are referred to in this description using the reference number in square brackets, [ ].

First Embodiment

Statistical Blockade Applied to Circuit Design

This embodiment uses a computing device programmed to receive circuit metric data and employs a novel, general, and efficient Monte Carlo method that addresses many of the problems previously described in the Background section: very fast generation of samples—rare events—with sound models of the tail statistics for any performance metric. The method imposes almost no a priori limitations on the form of the statistics for the process parameters, device models, or performance metrics. The method is conceptually simple, and it exploits ideas from two rather nontraditional sources.

To obtain both samples and statistics for rare events, there may be a need to generate and evaluate an intractable number of Monte Carlo samples. Generating each sample is neither challenging nor expensive: mere creation of the parameters for a circuit is required. Evaluating the sample is expensive, because it is simulated. This embodiment provides a means to quickly filter these samples, and block those that are unlikely to fall in the low-probability tails of interest. Many samples could be generated, but very few simulated. Therefore, it is necessary to exploit of ideas from data mining (see Background reference [10]) to build classifier structures, from a small set of Monte Carlo training samples, in order to create the necessary blocking filter. Given these samples, the invention uses the rigorous mathematics of Extreme Value Theory (EVT) (see Background reference [11]), the theory of the limiting behavior of sampled maxima and minima) to build sound models of these tail distributions. The essential "blocking" activity of the filter gives the technique its name: Statistical Blockade.

Statistical blockade has been tested on both SRAM and flip-flop designs, including a complete 64-cell SRAM column (a 403-parameter problem), accounting for both local and global variations. In contrast to several prior studies (see Background references [5-6, 10]), simulating only one cell does not correctly estimate the critical tail statistics. However, Statistical Blockade allows the generation of both samples and accurate statistics, with speedups of 10×-100× over standard Monte Carlo.

Extreme Value Theory

EVT provides mathematical tools to build models of the tails of distributions. It has been used extensively in climatology and risk management, among other applications: wherever the probability of extreme and rare events needs to be modeled. Here the mathematical concepts from EVT are introduced that the invention relies on. Suppose a threshold is defined for some random variable (e.g. the SNM of an SRAM cell) with Cumulative Density Function (CDF): All values above constitute the tail of the distribution. For this embodiment, only the upper tail is considered: this is without loss of generality, since a simple sign change converts a lower tail to the upper tail. Now, the conditional CDF of excesses above is defined as:

$$F_t(x) = P\{X - t \geq x \mid X \geq t\} \quad \text{(Equation 1)}$$
$$= \frac{F(x+t) - F(t)}{1 - F(t)}$$
$$\text{for } x \geq 0$$

An important distribution in the theory of extreme values is the Generalized Pareto Distribution (GPD), which has the following CDF:

$$G_{a,k}(x) = \begin{cases} 1 - (1 - kx/a)^{1/k}, & k \neq 0 \\ 1 - e^{-x/a}, & k = 0 \end{cases} \quad \text{(Equation 2)}$$

The seminal result exploited is from Balkema and de Haan (see Background reference [16]) and Pickands (see Background reference [17]) (referred to as BdP) who proved that:

$$\lim_{t \to \infty} sup_{x \geq 0} |F_t(x) - G_{a,k}(x)| = 0 \quad \text{(Equation 3)}$$

if and only if is in the maximum domain of attraction (MDA) of the Generalized Extreme Value distribution (GEV): F∈MDA($H_\eta$). This means that when the distribution F satisfies the given condition (F∈MDA($H_\eta$)), the conditional CDF of F tends, as the threshold is moved farther and farther out on the tail, towards a particularly tractable analytical form.

The GEV CDF is as follows:

$$H_\eta(x) = \begin{cases} e^{-(1+\eta x)^{-1/\eta}}, & \eta \neq 0 \\ e^{-e^{-x}}, & \eta = 0 \end{cases} \text{where } 1 + \eta_x > 0 \quad \text{(Equation 4)}$$

It combines three simpler distributions into one unified form:

For $\eta=0$, the Gumbel-type (or Type I) distribution results:

$$\Lambda(x) = e^{-e^{-x}} \quad \text{(Equation 5)}$$

For $\eta>0$, the Fréchet-type (or Type II) distribution results:

$$\Theta_\alpha(x) = e^{-x^{-\alpha}} \text{ for } x>0, \alpha=\eta^{-1} \quad \text{(Equation 6)}$$

For $\eta<0$, the Weibull-type (or Type III) distribution results:

$$\psi_\alpha(x) = e^{-|x|^\alpha} \text{ for } x<0, \alpha=-\eta^{-1} \quad \text{(Equation 7)}$$

Consider now what the "maximum domain of attraction" means. Consider the maxima ($M_n$) of n i.i.d. random variables. Suppose there exist normalizing constants θ and b, such that:

$$P\{(M_n - b_n)/a_n \leq x\} = F^n(a_n x + b_n) \to H(x) \text{ as } n \to \infty \quad \text{(Equation 8)}$$

for some non-degenerate H(x). Then we say that F is "in the maximum domain of attraction" of H. In other words, the maxima of n i.i.d. random variables with CDF F, when properly normalized, converge in distribution to a random variable with the distribution H.

Fisher and Tippett (see Background reference [18]) and Gnedenko (see Background reference [19]) showed that for a large class of distributions:

F∈MDA(H) ⇒ H is a type of $H_\eta$ (Equation 9)

For example (see Background reference [10]), MDA(Λ) includes the normal, exponential, gamma, and lognormal distributions; MDA($\Theta_\alpha$) includes the Pareto, Burr, log-gamma, Cauchy, and t-distributions; MDA($\psi_\alpha$) includes finite-tailed distributions like the uniform and beta distributions. Hence, for a large class of distributions, the BdP theorem holds true. In other words, if enough points in the tail of a distribution (x≥t) can be generated, in most cases, a GPD can be fit to the data and predictions can be made further out in the tail. This is a remarkably practical and useful result for the rare circuit event scenarios sought for modeling. In particular, it shows that most prior ad hoc fitting strategies are at best sub-optimal, and at worst, simply wrong.

Model Fitting and Prediction

Assuming that points in the tail can be generated, there remains the problem of fitting a GPD form to the conditional CDF. Several options are available here (see Background reference [20]): moment matching, maximum likelihood estimation (MLE) and probability weighted moments (PWM) (see Background reference [21]). PWM was chosen because it seems to have lower bias (see Background reference [20]) and does not have the convergence problems of MLE. However, no restrictions on the type of fitting method to be used here is imposed. The PWMs of a continuous random variable with CDF are the quantities $$M_{p,r,s} = E[x^p \{F(x)\}^r \{1-F(x)\}^s] \quad \text{(Equation 10)}$$

which often have simpler relationships with the distribution parameters than conventional moments $M_{p,0,0}$. For the GPD it is convenient to use these particular PWMs $$\alpha_s = M_{1,0,s} = E[x\{1-F(x)\}^s] = \frac{a}{(s+1)(s+1+k)} \quad \text{(Equation 11)}$$

which exist for k>−1: This is true for most cases of interest (see Background reference [20]). The GPD parameters are then given by $$a = \frac{2\alpha_0 \alpha_1}{\alpha_0 - 2\alpha_1}, k = \frac{\alpha_0}{\alpha_0 - 2\alpha_1} - 2 \quad \text{(Equation 12)}$$

where the PWMs are estimated from the samples as $$\tilde{\alpha}_i = n^{-1} \Sigma_{j=1}^n (1-p_{j|n})^i x_{j|n} \quad \text{(Equation 13)}$$

where $x_{1|n} \leq \ldots \leq x_{n|n}$ In are the ordered samples and $p_{j|n} = (j+\gamma)/(n+\delta)$. Here, $\gamma = -0.35$ and $\delta = 0$, as suggested in Background reference [20].

Given the ability to fit the GPD form, consider the problem of predicting useful probabilities. After obtaining a GPD model of the conditional CDF above a threshold t, the exceedence probability—the failure probability—for any value $x_f$ can be predicted:

$$P(X > x_f) = [1 - P(X \leq t)][1 - F_t(x_f - t)] \quad \text{(Equation 14)}$$

Here, $P(X \leq t)$ can be computed using empirical data obtained from standard Monte Carlo, or more sophisticated variance reduction techniques, for example, mixture importance sampling (see Background reference [8]). $F_t(x_f - t)$ is just the prediction by the GPD model. Hence, we can write Equation 14 as $$P(X > x_f) = [1 - F(t)][1 - G_{a,k}(x_f - t)] \quad \text{Equation 15}$$

Statistical Blockade Classification-Based Sampling

Even with all the useful theory presented above, a way is still needed to efficiently generate samples in the tail of the distribution of the performance metric of a circuit. Standard Monte Carlo is very unsuited to this job, because it generates samples that follow the complete distribution. The problem is severe for rare event statistics: If the target threshold is the 99% point of the distribution, only one out of 100 simulations will be useful for building the tail model.

Our approach is to build a so-called classifier to filter out candidate Monte Carlo points that will not generate a performance value in the tail. Then, only those Monte Carlo points that will generate points in the tail are simulated. For clarity, this structure is referred to as the blockade filter, and its action as blockade filtering. Ideas are borrowed from the data-mining community (see Background reference[10]) to build the filter. A classifier is an indicator function that allows us to determine set membership for complex, high-dimensional, nonlinear data. Given a data point, the classifier reports true or false on the membership of this point in some arbitrary set. For statistical blockade, this is the set of parameter values not in the extremes of the distributional tail we seek. The classifier is built from a relatively small set of representative sample data and need not be perfectly accurate to be effective.

Consider this filter and its construction. Suppose the statistical parameters ($V_t$, $t_{ox}$, etc.) in a circuit are denoted by $s_i$, and the performance metric being measured is y. The sampling strategy tries to simulate only those points $\{s_i\}$, that result in values of y≧t. This is accomplished in three steps (shown in FIG. 3):

1) Perform initial sampling to generate data to build a classifier. This initial sampling is also used for estimating (see Background reference 20), and could be standard Monte Carlo or importance sampling.
2) Build a classifier using a classification threshold $t_c$. To minimize false negatives (tail points classified as non-tail points), choose $t_c < t$.
3) Generate more samples using Monte Carlo, following the Cumulative Density Function (CDF) F, but simulate only those that are classified as tail points.

Using the tail points generated by the blockade-filtered sampling, we can then build a conditional CDF model for the tail, using the tools of EVT and Model Fitting and Prediction. As long as the number of false negatives is acceptably low, the simulated tail points are true to the actual distribution. Hence, there is no need to unbias the estimates. Note that the approach is reminiscent of acceptance-rejection sampling (see Background reference [2]).

In this work, the classifier used is a Support Vector Machine (SVM) (see Background reference [22]). The time for model building and classification is negligible compared to the total simulation time. Apart from this practical consideration, there is no restriction on the type of classifier that can be used. Classification is a rich and active field of research in the data mining community and there are many options for choosing a classifier (see Background reference [10]). SVMs are a popular, well-researched classifier strategy, and optimized implementations are readily available (see Background reference [22]).

Experimental Results

The Statistical Blockade method was applied to three testcases: a single 90 nm SRAM cell, a 45 nm master-slave flip-flop, and a full 64-bit 90 nm SRAM column. The initial sampling to construct each blockade filter was a standard Monte Carlo run of 1000 points. An SVM classifier was built using the 97% point (of each relevant performance metric) as the classification threshold $t_c$. The tail threshold t was defined as the 99% point.

One technical point should specifically be noted about the SVM construction: Since the sample set is biased with many more points in the body of the distribution than in the tail, the classification error needs to be unbiased (see Background reference [23]). Suppose that, of the 1000 simulated training points, T<<1000 actually fall into the tail of interest. Since the two classification sets (true/false) have an unbalanced number of points, the SVM classifier will be biased toward the body (1000-T points). Even if all T of the tail points are misclassified, the error rate is quite low if the body is classified correctly. Hence, classification error in the tail is penalized more—by a weighting factor of roughly T—than errors in the body, to try to avoid missing tail points. A weight value of 30 for these results is used.

The first testcase is shown in FIG. 9: a 6-T SRAM cell, with bit-lines connected to a column multiplexor and a non-restoring write driver. The metric being measured is the write time $\tau_w$: the time between the wordline going high to the non-driven cell node (node 2) transitioning. Here, "going high" and "transitioning" imply crossing 50% of the full-voltage change. The device models used are from the Cadence 90 nm Generic PDK library. There are 9 statistical parameters: 8-Vt variations to model random dopant fluctuation (RDF) (see Background reference [24]) effects in the transistors named in FIG. 9, and 1 global gate-oxide variation. All variations are assumed to be normally distributed about the nominal value. The Vt standard deviation is $$\sigma(V_t) = \frac{5\,\mathrm{mV}}{\sqrt{WL}} \text{ where } W, L \text{ are in } \mu\mathrm{m} \qquad \text{(Equation 16)}$$

This variation is too large for the 90 nm process, but is in the expected range for more scaled technologies; this creates a good stress test for the method. The gate-oxide standard deviation is taken as 2%.

One-hundred-thousand Monte Carlo points were blockade-filtered through the classifier, generating 4,379 tail candidates. After simulating these 4,379 points, 978 "true" tail points were obtained. The tail model obtained from these points is compared with the empirical tail conditional CDF obtained after simulating 1 million Monte Carlo points, in FIG. 10. Table 1 shows a comparison of the failure probability predictions for different values of $\tau_w$, expressed as equivalent sigma points:

$$x_\sigma = \phi^{-1}(G_{a,k}(\tau_w)) \qquad \text{(Equation 17)}$$

where is the standard normal CDF. This is the equivalent point on a standard normal that would have the same cumulative probability. For example, $x_\sigma=3$ implies a cumulative probability of 0.99865 and a failure probability of 0.00135. The delays are expressed as multiples of the fanout-of-four (FO4) delay of the process.

Table 1 also shows predictions from an accurate tail model built using the 1 million Monte Carlo points, without any filtering. The empirical prediction fails beyond 2.7 FO4 because there are simply no points generated by the Monte Carlo run so far out in the tail (beyond 4.8σ).

TABLE 1

Comparison of predictions by Monte Carlo, Monte Carlo with tail modeling and statistical blockade filtering, for single SRAM cell. The number of simulations includes the 1000 training samples.

| $\tau_w$ | Standard Monte Carlo (1M sims) | GPD No Blockade Filter (1M sims) | GPD With Blockade Filter (5,379 sims) |
|---|---|---|---|
| 2.4 | 3.404 | 3.408 | 3.379 |
| 2.5 | 3.886 | 3.886 | 3.868 |
| 2.6 | 4.526 | 4.354 | 4.352 |
| 2.7 | ∞ | 4.821 | 4.845 |
| 2.8 | ∞ | 5.297 | 5.356 |
| 2.9 | ∞ | 5.789 | 5.899 |
| 3.0 | ∞ | 6.310 | 6.493 |

Table 1 above shows two important advantages of the Statistical Blockade Filter approach:
Even without any filtering, the GPD tail model is better than Monte Carlo, since it can be used to predict probabilities far out in the tail, even when there are no points that far out.

Using blockade filtering, coupled with the tail model, we can drastically reduce the number of simulations (from 1 million to 5,379) and still generate a reliable tail model.

The second test case involves a master-slave flip-flop within a scan chain, and is shown in FIG. 11. A large chip can have tens of thousands of instances of the same flip-flop. Typically, these flip-flops are in a scan chain to enable rigorous testing. Random threshold variation in the scan chain transistors can also impact the performance of the flip-flop.

The design has been implemented using the 45 nm CMOS Predictive Technology Models from (see Background reference [26]). Variations considered include RDF for all transistors in the circuit and one global gate-oxide variation. Threshold variation is modeled as normally distributed $V_t$ variation:

$$\sigma(V_t) = 0.0135 \frac{V_{t0}}{\sqrt{WL}}, \text{ where } W, L \text{ are in } \mu\mathrm{m} \qquad \text{(Equation 18)}$$

$V_{t0}$ is the nominal threshold voltage. This results in 30% standard deviation for a minimum-sized transistor. The $t_{ox}$ standard deviation is taken as 2%. The metric being measured is the clock-output delay, in terms of the FO4 delay. A GPD model was built using 692 true tail points, obtained from 7,785 candidates blockade filtered from 100,000 Monte Carlo samples. FIG. 12 compares this model with (1) the empirical CDF from 500,000 standard Monte Carlo simulations, and (2) a GPD model built from after blockade filtering these 500,000 points. The discrepancy of the models can be explained by looking at the empirical PDF of the delay in FIG. 13. Due to the heavy tail, slight variations in the tail samples chosen can cause large variations in the model. This embodiment is still able to generate an acceptably accurate model, as is evident by the comparison of in Table 3. Standard Monte Carlo starts under-estimating the failure probability (over-estimating) far out in the tail (from row 3 on). The tail model has much better predictive power (column 2):=4.283 implies a failure probability of 9.2 ppm. Even with blockade filtering, the tail model is still quite accurate. Table 2 also shows the estimates from a standard Gaussian distribution fit to 20,000 Monte Carlo points: It is obvious that such a simplifying assumption severely under-estimates the failure probability.

TABLE 2

Comparison of predictions by Monte Carlo, Monte Carlo with GPD modeling, statistical blockade-filtered GPD modeling, and standard Gaussian approximation, for MSFF. The number of simulations includes the 1000 training samples.

| $\tau_{cq}$ | Standard Monte Carlo (500k sims) | GPD No Blockade Filter (500k sims) | GPD With Blockade Filter (500k sims) | Gaussian Tail Approx. (20k sims) |
|---|---|---|---|---|
| 30 | 3.424 | 3.466 | 3.431 | 22.127 |
| 40 | 3.724 | 3.686 | 3.661 | 30.05 |
| 50 | 4.008 | 3.854 | 3.837 | 37.974 |
| 60 | 4.219 | 3.990 | 3.978 | 45.898 |
| 70 | 4.607 | 4.102 | 4.095 | 53.821 |
| 80 | ∞ | 4.199 | 4.195 | 61.745 |
| 90 | ∞ | 4.283 | 4.282 | 69.669 |

The third test case involves a 64-bit SRAM column, with non-restoring write driver and column multiplexor, and is shown in FIG. 14. Only one cell is being accessed, while all the other wordlines are turned off. Random threshold variation on all 402 devices (including the write driver and column mux) are considered, along with a global gate-oxide variation. The device and variation models are the same 90 nm technology as the single SRAM cell previously discussed. In scaled technologies, leakage is no longer negligible. Hence, process variations on devices that are meant to be inaccessible can also impact the overall behavior of a circuit. This testcase allows us to see the impact of leakage through the 63 off cells, along with variations in the write driver.

The metric measured is the write time ($\tau_w$), from $w1_0$ to node 2. The number of statistical parameters is 403 in this case. Building a classifier with only 1000 points in 403 dimensional space is nearly impossible. Hence, the dimensionality is reduced by choosing only those parameters that significantly affect the output. We employ standard statistical sensitivity techniques. We measure this significance with Spearman's Rank Correlation Coefficient (see Background reference [25]), $r_s$. Suppose $R_i$ and $S_i$ are the ranks of corresponding values of two variables in a dataset, then their rank correlation is given as:

$$r_s = \frac{\sum_i (R_i - \overline{R})(S_i - \overline{S})}{\sqrt{\sum_i (R_i - \overline{R})^2} \sqrt{\sum_i (S_i - \overline{S})^2}}$$

(Equation 19)

This measure of correlation is more robust than a linear Pearson's correlation, in the presence of non-linear relationships in the data. FIG. 15 shows the sorted magnitudes of the 403 rank correlation values, computed between the statistical parameters and the output. For classification, only the parameters with $|r_s|>0.1$ were chosen. This reduced the dimensionality to only 11: The devices chosen by this method were the pull-down and output devices in the active AND gate, the column mux device, the bitline pull-down devices, and all devices in the 6-T cell, except for $M_{p2}$ (since node 2 is being pulled down in this case). This selection coincides with a designer's intuition of the devices that would have the most impact on the write time in this testcase.

The empirical CDF from 100,000 Monte Carlo samples is compared with the tail model obtained by blockade filtering 20,000 Monte Carlo samples (218 true tail points from 1046 filtered candidates) in FIG. 16. Also shown, is the tail model obtained by blockade filtering the 100,000 Monte Carlo samples. Table 3 compares the following: the $x_\alpha$ predictions from standard Monte Carlo; a GPD tail model with no filtering; two different GPD tail models with filtering of 20,000 and 100,000 points, respectively; and a standard Gaussian fit to 20,000 points. It can be observed that the 218 true tail points obtained by blockade filtering only 20,000 Monte Carlo samples is not enough to build a reliable tail model. However, much better results can be obtained using the 1077 true tail points obtained by Statistical Blockade filtering 100,000 Monte Carlo samples (5314 simulations). The Gaussian again underestimates the failure probability.

TABLE 3

Comparison of predictions by Monte Carlo, Monte Carlo with tail modeling, statistical blockade-filtered tail modeling, and standard Gaussian approximation, for SRAM column. The number of simulations includes the 1000 training samples.

| $\tau_w$ | Standard Monte Carlo (100k sims) | GPD No Blockade Filter (20k pts; 2046 sims) | GPD With Blockade Filter (100k sims) | GPD With Blockade Filter (100k pts; 6314 sims) | Gaussian Tail Approx. (20k sims) |
| --- | --- | --- | --- | --- | --- |
| 2.7 | 2.966 | 2.986 | 2.990 | 3.010 | 3.364 |
| 2.8 | 3.367 | 3.373 | 3.425 | 3.390 | 3.898 |

TABLE 3-continued

Comparison of predictions by Monte Carlo, Monte Carlo with tail modeling, statistical blockade-filtered tail modeling, and standard Gaussian approximation, for SRAM column. The number of simulations includes the 1000 training samples.

| $\tau_w$ | Standard Monte Carlo (100k sims) | GPD No Blockade Filter (20k pts; 2046 sims) | GPD With Blockade Filter (100k sims) | GPD With Blockade Filter (100k pts; 6314 sims) | Gaussian Tail Approx. (20k sims) |
| --- | --- | --- | --- | --- | --- |
| 2.9 | 3.808 | 3.743 | 3.900 | 3.747 | 4.432 |
| 3.0 | ∞ | 4.101 | 4.448 | 4.088 | 4.966 |
| 3.1 | ∞ | 4.452 | 5.138 | 4.416 | 5.499 |
| 3.2 | ∞ | 4.799 | 6.180 | 4.736 | 6.033 |
| 3.3 | ∞ | 5.147 | — | 5.049 | 6.567 |
| 3.4 | ∞ | 5.496 | — | 5.357 | 7.100 |

Comparing with Table 1, the simulating variations in a single cell, without modeling variation in the environment circuitry (other cells in the column and the write driver itself), can lead to large underestimation of the delay spread: 3.0 FO4 delay is estimated as a 6.3 σ point (Table 1), while it is actually a 4.1σ point (Table 3).

Before concluding, two points should be emphasized. First, across all three testcases, there were significant improvements in accuracy over simple Gaussian fits, and similar improvements in fitting when using the GPD model and simple Monte Carlo sampling. However, there are also significant speedups over simple Monte Carlo, ranging from roughly one to two orders of magnitude.

Finally, this embodiment can obviously be extended. The testcases shown herein all measure a single performance metric. This embodiment is, however, flexible enough to accommodate multiple metrics: multiple classifiers can be trained from the same training set, one for each metric. Each classifier would then identify potential tail points for its corresponding metric, which can be simulated and used to build a tail model for every metric. In the worst case, the tail samples of two metrics might be mutually exclusive, resulting in approximately twice the number of simulations as compared to the case of a single metric. In the best case, the tail samples of the metrics would overlap and there would not be any significant increase in the number of simulations.

Conclusions

Statistical Blockade is an efficient and flexible framework for (1) generating samples in the tails of distributions of circuit performance metrics, and (2) deriving sound statistical models of these tails. This enables the prediction of failure probabilities given thresholds far out in the tails. These methods offer both significantly higher accuracy than standard Monte Carlo, and speedups of one to two orders of magnitude across a range of realistic circuit testcases and variations.

Second Embodiment

Extended Statistical Blockade Applied to Circuit Design

This embodiment uses a computing device programmed to receive circuit metric data and employ significant extensions of Statistical Blockade (described in the First Embodiment above and in Background reference [1]) to make the process of providing an output that identifies and/or predicts system failures practically usable for many common scenarios. Speedups of 102+ over standard Statistical Blockade and 10⁴+ over standard Monte Carlo, for an SRAM cell in an industrial 90 nm technology have been realized.

Statistical Blockade is a general and efficient Monte Carlo method that addresses both problems previously described: very fast generation of samples—rare events—with sound models of the tail statistics for any performance metric. The method imposes almost no a priori limitations on the form of the statistics for the process parameters, device models, or performance metrics. The key observation behind Statistical Blockade is that generating each sample is not expensive: the parameters for a circuit are merely being created.

Evaluating the sample is expensive, because it is simulated. The invention involves a method to quickly filter these samples, and block those that are unlikely to fall in the low-probability tails sought. It uses techniques from data mining [Background reference 10] to build classifier structures, from a small set of Monte Carlo training samples, to create the necessary blocking filter. Given these samples, it showed how to use the rigorous mathematics of Extreme Value Theory (EVT) (see Background reference [11]) to build sound models of these tail distributions. Statistical Blockade was successfully applied to a variety of circuits with dimensionality ranging up to 403, with speedups of up to 2 orders of magnitude over Standard Monte Carlo.

Statistical Blockade can, however, completely fail for certain commonly seen SRAM metrics (e.g., data retention voltage) because of the presence of conditionals in the formulation of the metric. Also, if rare samples with extremely low probability (e.g. 5 and beyond) are required, Statistical Blockade can still become prohibitively expensive. Accordingly, the Statistical Blockade technique can be extended in two significant ways: 1) creation of a solution to solve the problem of Statistical Blockade failing for certain common SRAM metrics, and 2) development of a recursive strategy to achieve further speedups of orders of magnitude, while simulating extremely rare events (5 and beyond).

Statistical Blockade Filtering

FIG. 1 shows an example distribution F(x) of a circuit metric; e.g., SRAM write time. As an example, consider a 1 Mb cache, where the SRAM cell has a failure probability of 1 ppm, given a failure threshold, $x_f$. In such a case, 1 million Monte Carlo samples would need to be simulated to generate one such failure event and made any prediction about the failure probability. In fact, many more would be needed to generate sufficient failure events to ensure statistical confidence of the prediction. This approach would become much worse for lower failure probabilities. This scenario is common in today's SRAM designs.

Statistical Blockade was proposed in Background reference [1] to significantly speed up the simulation of rare events and prediction of low failure probabilities. Statistical Blockade defines a tail threshold (for example, the 99% point), as shown in FIG. 1. Without loss of generality, the part of the distribution greater than is called the tail. The key idea is to identify that region in the parameter (process variable) space that yields circuit performance values (e.g., SRAM write time) greater than t. Once this is known, those Monte Carlo samples that do not lie in this tail region are not simulated, or blocked. Only those Monte Carlo samples that lie in the tail region are simulated. Hence, the number of simulations can be significantly reduced. For example, if is the 99-th percentile, only 1% of the Monte Carlo samples will be simulated, resulting in an immediate speedup of 100× over standard Monte Carlo.

To build this model of the boundary of the tail region a small Monte Carlo sample set (1,000 points) is used to train a classifier. A classifier is an indicator function that allows determination of the set membership for complex, high-dimensional, nonlinear data. Given a data point, the classifier reports true or false on the membership of this point in some arbitrary set. For Statistical Blockade, this is the set of parameter values not in the tail region of interest. However, it is difficult, if not impossible, to build an exact model of the tail region boundary. Hence, the requirement to allow for classification error is relaxed. This is done by building the classification boundary at a classification threshold that is less than the tail threshold $t_c$. FIG. 2 shows this relaxed classification boundary in the parameter space. The dashed line is the exact boundary of the tail region for the tail threshold t, and the solid line is the relaxed classification boundary for the classification threshold $t_c$.

Statistical Blockade filtering is then accomplished in three steps (see FIG. 3):
1) Perform initial sampling to generate data to build a classifier. This initial sampling can be standard Monte Carlo or importance sampling.
2) Build a classifier using a classification threshold $t_c$. To minimize false negatives (tail points classified as non-tail points), choose $t_c < t$.
4) Generate more samples using Monte Carlo, following the Cumulative Density Function (CDF) F, but simulate only those that are classified as tail points.

From the simulated samples, some will be in the tail region and some will be in the non-tail region. Background reference [1] shows how to use Extreme Value Theory to fit a parametric distribution (the Generalized Pareto Distribution) to these tail points to generate an analytical model for the failure probability, given any failure threshold $x_f > t$.

Classifier Determinations

Consider the 6-T SRAM cell shown in FIG. 4. With scaling reaching nanometer feature sizes, subthreshold and gate leakage become very significant. Particularly for the large memory blocks seen today, the standby power consumption due to leakage can be intolerably high. Supply voltage ($V_{dd}$) scaling (see Background reference [12]) is a powerful technique to reduce this leakage, whereby the supply voltage is reduced when the memory bank is not being accessed. However, lowering $V_{dd}$ also makes the cell unstable, ultimately resulting in data loss at some threshold value of $V_{dd}$, known as Data Retention Voltage or DRV. Hence, DRV is the lowest supply voltage that still preserves the data stored in the cell. DRV is computed as follows:

$$DRV = \max(DRV_0, DRV_1) \quad \text{(Equation 20)}$$

where $DRV_0$ is the DRV when the cell is storing a 0, and $DRV_1$ is the DRV when it is storing a 1. If the cell is balanced (symmetric), then $DRV_0 = DRV_1$. However, if there is any mismatch due to process variations, they become unequal. This creates a situation where the standard Statistical Blockade classification technique would fail.

Suppose a 1,000 sample Monte Carlo is run, varying all the mismatch parameters in the SRAM cell according to their statistical distributions. This would give distributions of values for $DRV_0$, $DRV_1$, and DRV. In certain parts of the mismatch parameter space $DRV_0 > DRV_1$, and in other parts $DRV_0 < DRV_1$. This is clearly illustrated in FIG. 5. Using SiLVR, from Background reference [13], the direction in the parameter space that has maximum impact on (maximum variation) is extracted, called latent variable. The figure plots the simulated $DRV_0$ and $DRV_1$ values along this direction ($d_{1,DRV0}$). It can clearly be seen that they are inversely related: one decreases as the other increases. Now, the max DRV from Equation 20 above is taken, and the classification threshold $t_c$ for DRV as the 97-th percentile. Then the worst 3% points are picked out from the classifier training data and plot them against the same direction $d_{1,\,DRV0}$, in FIG. 5. These points (squares) clearly lie in two disjoint parts of the parameter space. Since the tail region defined by a tail threshold $t>t_c$ would be a subset of the classifier tail region (defined by $t_c$), it is obvious that the tail region consists of two disjoint regions of the parameter space. This is illustrated with a 2-D example in FIG. 6. The figure also shows the direction vector for $d_{1,\,DRV0}$. The solid tail regions on the top-right and bottom-left corners of the parameter space correspond to the large DRV values shown as squares in FIG. 5.

In such a situation the Statistical Blockade classifier is unable to create a single boundary to separate the tail and non-tail regions. The problem stems from the max operation for DRV shown above in Equation 20, since it combines subsets of the tail regions of $DRV_0$ and $DRV_1$ to generate the tail region of DRV. The same problem occurs for any other such metric (e.g., Static Noise Margin) with a conditional operation. This leads to the following solution.

Instead of building a single classifier for the tail of DRV in the max operation for DRV shown above in Equation 20, two separate classifiers are built, one for the 97-th percentile ($t_c(DRV_0)$) of $DRV_0$, and another for the 97-th percentile ($t_c(DRV_1)$) of $DRV_1$. The generated Monte Carlo samples will then be filtered through both these classifiers: points classified as non-tail by both the classifiers will be blocked, and the rest will be simulated. In the general case, if the circuit metric y is given as:

$$y = \max(y_0, y_1, \ldots) \quad \text{(Equation 21)}$$

then the resulting algorithm is as follows:
1) Perform initial sampling to generate data to build a classifier and estimate tail and classification thresholds.
2) For each argument $y_i$ of the conditional max circuit operation above in Equation 21, build a classifier $C_i$ at a classification threshold $t_c(y_i)$ that is less than the tail threshold $t(y_i)$.
3) Generate more samples using Monte Carlo, but block the samples classified as non-tail by all the classifiers. Simulate the rest and compute y for the simulated points.

Hence, in the case of FIG. 6, a separate classifier is built for each of the two boundaries. From the simulated points, those with y>t are chosen as tail points for further analysis (see Background reference [1]). Also note that this same algorithm can be used for the case of multiple metrics. Each metric would have its own thresholds and its own classifier, just like each argument in the max operation for y in Equation 21 above.

Simulating Extremely Rare Events

Consider a 10 Mb memory, with no redundancy or error correction. Even if the failure probability of each cell is as low as 0.1 ppm, every such chip will still fail on average. Hence, the worst case (largest) DRV from a 10 million Monte Carlo should, on average, be below the standby voltage. To estimate this, at least 10 million Monte Carlo samples have to be run. To reduce the chip failure probability to less than 1%, the worst case DRV from a 1-billion Monte Carlo run needs to be looked at. This is equivalent, approximately, to the 6 $\sigma$ value of DRV—the 6 $\sigma$ point from a standard normal distribution has the same failure probability. Using Statistical Blockade, the number of samples can be reduced, using a classification threshold $t_c$=97-th percentile. This would reduce the number of simulations from 1 billion to 30 million, which is still very large. Even with a perfect classifier, choosing $t_c=t$=99-th percentile, the number of simulations would still be 10 million. Moving to higher percentiles will help reduce this further, but many more initial samples will be needed for a believable estimate of and for training the classifier. This simulation count can be drastically reduced using a recursive formulation.

Let us first assume that there are no conditionals. For a tail threshold equal to the $\alpha$-th percentile, let us represent it as, and the corresponding classification threshold as $t_c^\alpha$. Using the algorithm from Section 3.2, build a classifier $C^\alpha$ and generate sufficient points with $y>t^\alpha$, so that a higher percentile ($t^\beta$, $t_c^\beta$, $\beta>\alpha$) can be estimated. For this new, higher threshold, a new classifier $C^\beta$ is trained and a new set of tail points ($y>t^\beta$) are generated. This new classifier will block many more points than $C^\alpha$, significantly reducing the number of simulations. This procedure is repeated to push the threshold out more till the tail region of interest is reached. The complete algorithm is shown in the flow diagram of FIG. 7.

The first step of the algorithm is essentially a for loop. See FIG. 7 (5). For each circuit metric, the balance of the commands of the algorithm are repeated for each argument of the conditional. See FIG. 7 (10). If there is no conditional, then the process stops. The conditional max is used without loss of generality. N is the total number of Monte Carlo samples that would be needed to reach the tail regions required; e.g., N=1 billion for reaching 6 G. The function MCarlo(n) generates n samples, and the function Simulate( ) actually simulates the samples passed to it.

The returned vector consists of both the input parameter sets for simulation and the corresponding circuit metrics computed for each sample. The function GetWorst($n_0$, x) returns the no worst samples from the set x. BuildClassifier(x, $t_c$) builds a classifier using training points x. The function Filter(C, x) blocks the samples in x classified as non-tail by C and returns the samples classified as tail points. The function Percentile(x, p) computes the p-th percentile of the output values in the set x.

The basic idea is to use a tail threshold (and its corresponding classification threshold) that is very far out in the tail, so that the simulations are restricted to the very rare events of interest. This is being done in a recursive manner by estimating lower thresholds first and using them to estimate the higher threshold without having to simulate a large number of points. For example, if it is desired to use the 99.9999 percentile as the tail threshold $t^{99.9999}$, the 99.99 percentile threshold $t^{99.99}$ is first estimated. To estimate this in turn, the 99 percentile threshold $t^{99}$ is first estimated. At each stage, a classifier is used that corresponds to that threshold to reduce the number of simulations for estimating the next-higher threshold.

Experimental Results

The techniques described above were applied to a standard 6 T SRAM cell, for the case of DRV. The cell was implemented in an industrial 90 nm process and all the mismatch statistical parameters were varied as per the industrial process design kit (PDK). A Support Vector Machine classifier (see Background reference [14]), similar to that in Background reference [1], was used.

The authors in Background reference [15] develop an analytical model for predicting the Cumulative Density Function (CDF) of the DRV, that uses not more than 5,000 Monte Carlo simulations. The CDF is given as:

$$F_{DRV}(x) = 1 - \mathrm{erfc}\left(\frac{\mu_0 + k(x - V_o)}{\sqrt{2}\,\sigma_0}\right) + \frac{1}{4}\left(\mathrm{erfc}\left(\frac{\mu_0 + k(x - V_o)}{\sqrt{2}\,\sigma_0}\right)\right)^2 \quad \text{(Equation 22)}$$

where x is the DRV value. k is the sensitivity of DRV to the supply voltage, computed using a DC sweep. $\mu_0$ and $\sigma_0$ are the mean and standard deviation of the Static Noise Margin distribution for the circuit, for a user-defined supply voltage $V_0$. These are computed using a short Monte Carlo run. Complete details regarding this analytical model are provided in Background reference [15]. The q-th quantile (e.g., the 6 σ point) can be estimated as:

$$DRV(q) = \frac{1}{k}\left(\sqrt{2}\,\sigma_0 \text{erfc}^{-1}(2 - 2\sqrt{q}) - \mu_0\right) + V_0 \quad \text{(Equation 23)}$$

Hence, is the supply voltage such that:

$$P(DRV \leq V_{dd}) = q \quad \text{(Equation 24)}$$

The worst-case DRV values from this technique are compared, for a given number of Monte Carlo samples, with the value predicted by Equation 24 for the corresponding quantile. For example, the 4.5 a DRV value can be computed from Equation 24 and compared with the worst-case DRV from a 1-million sample Monte Carlo run: 1 ppm is the failure probability of the 4.5 σ point.

FIG. 7 shows a graphical comparison of five different methods:

1) Analytical: The 3 σ to 8 σ DRV values (quantiles) predicted by Equation 24.

2) Recursive Statistical Blockade: The algorithm in FIG. 7 was run for N=1 billion: the while loop of the algorithm was run three times, corresponding to 100,000, 10 million, and 1 billion Monte Carlo samples, respectively. The worst-case DRV from these three recursion stages are estimates of the 4.26 σ, 5.2 σ, and 6 σ points, respectively.

3) EVT model: The tail points from the last recursion stage (1 billion Monte Carlo) are used to fit a Generalized Pareto Distribution (GPD), as per Background reference [1]. This GPD is then used to predict the 3 σ to 8 σ DRV values.

4) Normal: A normal distribution is fit to data from a 1,000 sample Monte Carlo run, and used to predict the same DRV values.

5) Lognormal: A lognormal distribution is fit to the same 1,000 Monte Carlo samples, and used for prediction.

According to the plots, the Recursive Statistical Blockade estimates are very close to the estimates from the analytical model. Table 4 below shows the number of circuit simulations performed at each of the three recursion stages, along with the initial 1,000 sample Monte Carlo run. The total number of simulations used is a very comfortable 41,721, resulting in a speedup of four orders of magnitude over standard Monte Carlo and 700 times over Statistical Blockade.

Also, the prediction power can be extended to 8 σ without any additional simulations, by using the GPD model. Standard Monte Carlo would need over 1.5 quadrillion points to generate an 8 point. For this case, the speedup over standard Monte Carlo is extremely large. The normal and lognormal fits show significant error compared to the analytical model. The normal fit is unable to capture the skewness of the actual DRV distribution, while the lognormal distribution has a heavier tail than the true DRV distribution and, hence, overestimates the skewness.

TABLE 4

Number of Circuit Simulations Run Per Recursion Stage to Generate a 6 σ DRV sample.

| Stage | Number of Simulations |
| --- | --- |
| Initial | 1,000 |
| 1 | 11,032 |
| 2 | 14,184 |
| 3 | 15,505 |
| Total | 41,721 |
| Speedup over Monte Carlo | 23,969x |
| Speedup over Statistical Blockade | 719x |

A final point to highlight is that recursive Statistical Blockade is a completely general technique to estimate rare events and their tail distributions. In the case of the SRAM cell DRV experiment, the inventors were fortunate to have an extremely recent analytical result against which to compare performance. Obviously, if one has such analytical models available, one should use them. Unfortunately, in most cases, one does not, and one must fall back on some sort of Monte Carlo analysis. In such scenarios, recursive Statistical Blockade has three attractive advantages:

1) It is circuit-neutral, by which it is meant that any circuit that can be simulated can be attacked with the technique;
2) It is metric-neutral, by which it is meant that any circuit performance metric that can be simulated can be analyzed with the technique;
3) As seen in the SRAM DRV experiments, it is extremely efficient, faster usually by several orders of magnitude than simple-minded brute-force Monte Carlo algorithms.

Conclusions

Statistical Blockade was proposed in Background reference [1] for 1) efficiently generating samples in the tails of distributions of circuit performance metrics, and 2) deriving sound statistical models of these tails. However, the standard Statistical Blockade method has some practical shortcomings: It fails for the case of circuit metrics with conditionals, and it requires prohibitively large number of simulations while sampling extremely rare events. The recursive formulation of Statistical Blockade of this embodiment overcomes both these issues efficiently. This new technique was applied to an SRAM cell in an industrial 90 nm technology to obtain speedups of up to 4 orders of magnitude over standard Monte Carlo and 2 orders of magnitude over standard Statistical Blockade.

Third Embodiment

Computational-Cost Reduction Using Statistical Blockade

This embodiment employs a method for use with respect to a manufacturing process, with the manufacturing process being susceptible to simulation of reliability, and the quality simulation being computationally costly. The method comprises the steps of performing a random sampling of possible events with respect to the manufacturing process; applying a classifier to the random sampling of possible events, the classifier yielding rareness value for each of the possible events; comparing the rareness values with a predefined rareness threshold, identifying events among the random sampling of possible events that are rarer than the predefined threshold; carrying out simulations of quality with respect to the identified events, yielding results thereof; and providing to a human user the results of the simulations; whereby the computational cost of performing applying, comparing, and simulating steps is less than the computational cost of carrying out simulations of quality with respect to the random sampling of possible events. This method would normally performed by way of programmed computing device that yields an output to a human-readable display or printout.

This method can be further extended wherein the random sampling of possible events is further characterized as Monte Carlo sampling.

This method can be further extended wherein the computational cost of the performing, applying, comparing, and simulating steps is less than one-tenth of the computational cost of carrying out simulations of quality with respect to the random sampling of possible events.

This method can be further extended wherein the computational cost of the performing, applying, comparing, and simulating steps is less than one-hundredth of the computational cost of carrying out simulations of quality with respect to the random sampling of possible events.

This method can be further extended wherein the manufacturing process is a process for manufacture of static random-access memory chips.

This method can be further extended wherein the simulations of quality are performed using SPICE simulations.

This method can be further extended wherein the simulation of quality comprises a simulation of reliability.

Fourth Embodiment

Computational-Cost Reduction Using Statistical Blockade

This embodiment employs a method for use with respect to a manufacturing process, with the manufacturing process being susceptible to simulation of quality, the quality simulation being computationally costly. The method comprising the steps of performing a first random sampling of possible events with respect to the manufacturing process; building a first classifier with respect to the first sampling, defining a first classification threshold indicating whether an event of the first sampling is in a tail or not; performing a second random sampling of possible events with respect to the manufacturing process; applying the first classifier to the second random sampling, yielding a subset of the second sampling; building a second classifier with respect to the subset of the second sampling, defining a second classification threshold indicating whether an event of the subset of the second sampling is in a tail or not; performing a last random sampling of possible events with respect to the manufacturing process; applying the last classifier to the last sampling, yielding a subset of the last sampling; carrying out simulations of quality with respect to the events in the subset of the last sampling, yielding results thereof; and providing to a human user the results of the simulations; whereby the computational cost of the performing, building, applying, and simulating steps is less than the computational cost of carrying out simulations of quality with respect to the random sampling of possible events. This method would normally performed by way of programmed computing device that yields an output to a human-readable display or printout.

This method can be further extended wherein after the second classifier is built, and before carrying out simulations, the following steps are performed: a third random sampling of possible events with respect to the manufacturing process is performed, the second classifier is applied to the third sampling, yielding a subset of the third sampling, and a third classifier with respect to the subset of the third sampling is built, defining a third classification threshold indicating whether an event of the subset of the third sampling is in a tail or not.

This method can be further extended wherein after the third classifier is built, and before carrying out simulations, the following steps are performed: a fourth random sampling of possible events with respect to the manufacturing process is performed, the third classifier is applied to the fourth sampling, yielding a subset of the third sampling, and a fourth classifier with respect to the subset of the fourth sampling is built, defining a fourth classification threshold indicating whether an event of the subset of the third sampling is in a tail or not.

This method can be further extended wherein the random sampling of possible events is further characterized as Monte Carlo sampling.

This method can be further extended wherein the computational cost of the performing, applying, comparing, and simulating steps is less than one-tenth of the computational cost of carrying out simulations of quality with respect to the random sampling of possible events.

This method can be further extended wherein the computational cost of the performing, applying, comparing, and simulating steps is less than one-hundredth of the computational cost of carrying out simulations of quality with respect to the random sampling of possible events.

This method can be further extended wherein the manufacturing process is a process for manufacture of static random-access memory chips.

This method can be further extended wherein the simulations of quality are performed using SPICE simulations.

This method can be further extended wherein the simulation of quality comprises a simulation of reliability.

Fifth Embodiment

Statistical Blockade Using Multiple-Classifier Simulation

This embodiment employs a method for use with respect to a manufacturing process, with the manufacturing process being susceptible to simulation of quality, the quality simulation being computationally costly. The method comprising the steps of performing a first random sampling of possible events with respect to the manufacturing process; applying a plurality of classifiers to the random sampling of possible events, each classifier yielding respective rareness values for each of the possible events; comparing each respective rareness value with a predefined respective rareness threshold, identifying events among the random sampling of possible events that are rarer than the respective predefined threshold; for each of the random sampling of possible events, evaluating a logical expression which is a function of the classifiers; carrying out simulations of quality with respect to the events for which the logical expression yields a predetermined value, yielding results thereof; and providing to a human user the results of the simulations, whereby the computational cost of the performing, applying, comparing, evaluating, and simulating steps is less than the computational cost of carrying out simulations of quality with respect to the random sampling of possible events. This method would normally performed by way of programmed computing device that yields an output to a human-readable display or printout.

This method can be further extended, wherein the number of classifiers is two, thereby defining a first classifier and a second classifier; and the logical expression is an "and" function, whereby the carrying out of a simulation of reliability with respect to an event takes place only if the first classifier identifies the event as being rarer than the respective predefined threshold of the first classifier, and if the second classifier identifies the event as being rarer than the respective predefined threshold of the second classifier.

This method can be further extended, wherein the number of classifiers is two, thereby defining a first classifier and a second classifier; and the logical expression is an "or" function, whereby the carrying out of a simulation of reliability with respect to an event takes place only if the first classifier identifies the event as being rarer than the respective predefined threshold of the first classifier, or if the second classifier identifies the event as being rarer than the respective predefined threshold of the second classifier.

This method can be further extended, wherein the random sampling of possible events is further characterized as Monte Carlo sampling.

This method can be further extended, wherein the computational cost of the performing, applying, comparing, and simulating steps is less than one-tenth of the computational cost of carrying out simulations of quality with respect to the random sampling of possible events.

This method can be further extended, wherein the computational cost of the performing, applying, comparing, and simulating steps is less than one-hundredth of the computational cost of carrying out simulations of quality with respect to the random sampling of possible events.

This method can be further extended, wherein the manufacturing process is a process for manufacture of static random-access memory chips.

This method can be further extended, wherein the simulations of quality are performed using SPICE simulations.

This method can be further extended, wherein the simulation of quality comprises a simulation of reliability.

Those skilled in the art will have no difficulty devising myriad obvious variations and improvements to the invention, all of which are intended to be encompassed within the scope of the claims which follow.

What is claimed is:

1. A method for simulating the effect of events of interest in a manufacturing process, the manufacturing process being susceptible to simulation, the method comprising the steps of:
   (a) generating a first randomly chosen sample of possible events;
   (b) performing the manufacturing process simulation on each of the events in the first randomly chosen sample;
   (c) using the results from step (b) to generate a classifier;
   (d) generating a second randomly chosen sample of possible events;
   (e) applying the classifier to each of the events in the second randomly chosen sample, the classifier yielding rareness values for each of the events;
   (f) comparing the rareness values with a predefined rareness threshold, thereby identifying events among the second randomly chosen sample that are rarer than the predefined threshold;
   (g) carrying out manufacturing simulations of the events identified in step (f), yielding results thereof; and
   (h) providing to a human user the results of the manufacturing simulations.

2. The method of claim 1, wherein the manufacturing process is a process for manufacture of static random-access memory chips.

3. The method of claim 1, wherein the simulations include SPICE simulations.

4. The method of claim 1, wherein the simulations include simulations of reliability.

5. A method for use with respect to a manufacturing process, the manufacturing process susceptible to simulation, the method comprising the steps of:
   (a) generating a first random sample of possible events;
   (b) performing the manufacturing simulation on the events in the first random sample;
   (c) using results from (b) to build a first classifier;
   (d) generating a second random sample of possible events;
   (e) applying the first classifier to the second random sample, yielding a subset of the second sample;
   (f) performing the manufacturing simulation on the subset of the second random sample;
   (g) using results from (f) to build a second classifier;
   (h) generating a third random sample of possible events;
   (i) applying the second classifier to the third sampling, yielding a subset of the third sampling;
   (j) carrying out the manufacturing simulations on events in the subset of the third sampling, yielding results thereof; and
   (k) providing to a human user the results of the simulations.

6. The method of claim 5, wherein the manufacturing process is a process for manufacture of static random-access memory chips.

7. The method of claim 5, wherein the manufacturing simulations include SPICE simulations.

8. The method of claim 5, wherein the manufacturing simulations include a simulation of reliability.

9. A method for use with respect to a manufacturing process, the manufacturing process susceptible to simulation, the method comprising the steps of:
   (a) obtaining a first random sampling of possible events with respect to the manufacturing process;
   (b) applying a plurality of classifiers to the random sampling of possible events, each classifier derived from manufacturing simulations of previous randomly sampled events, each classifier yielding respective rareness values for each of the possible events;
   (c) comparing each respective rareness value with a predefined respective rareness threshold, identifying events among the random sampling of possible events that are rarer than the respective predefined threshold;
   (d) for each of the random sampling of possible events, evaluating a logical expression which is a function of the classifiers;
   (e) carrying out manufacturing simulations with respect to the events for which the logical expression yields a predetermined value, yielding results thereof; and
   (f) providing to a human user the results of the simulations.

10. The method of claim 9, wherein:
    the number of classifiers is two, thereby defining a first classifier and a second classifier; and
    the logical expression is an "and" function, whereby the carrying out of a simulation with respect to an event takes place only if the first classifier identifies the event as being rarer than the respective predefined threshold of the first classifier, and if the second classifier identifies the event as being rarer than the respective predefined threshold of the second classifier.

11. The method of claim 9, wherein:
    the number of classifiers is two, thereby defining a first classifier and a second classifier; and
    the logical expression is an "or" function, whereby the carrying out of a simulation with respect to an event takes place only if the first classifier identifies the event as being rarer than the respective predefined threshold of the first classifier, or if the second classifier identifies the event as being rarer than the respective predefined threshold of the second classifier.

12. The method of claim 9, wherein the random sampling of possible events is further characterized as Monte Carlo sampling.

13. The method of claim 9, wherein the manufacturing process is a process for manufacture of static random-access memory chips.

14. The method of claim 9, wherein the manufacturing simulations include SPICE simulations.

15. The method of claim 9, wherein the manufacturing simulations include simulations of reliability.

* * * * *